Patented July 31, 1934

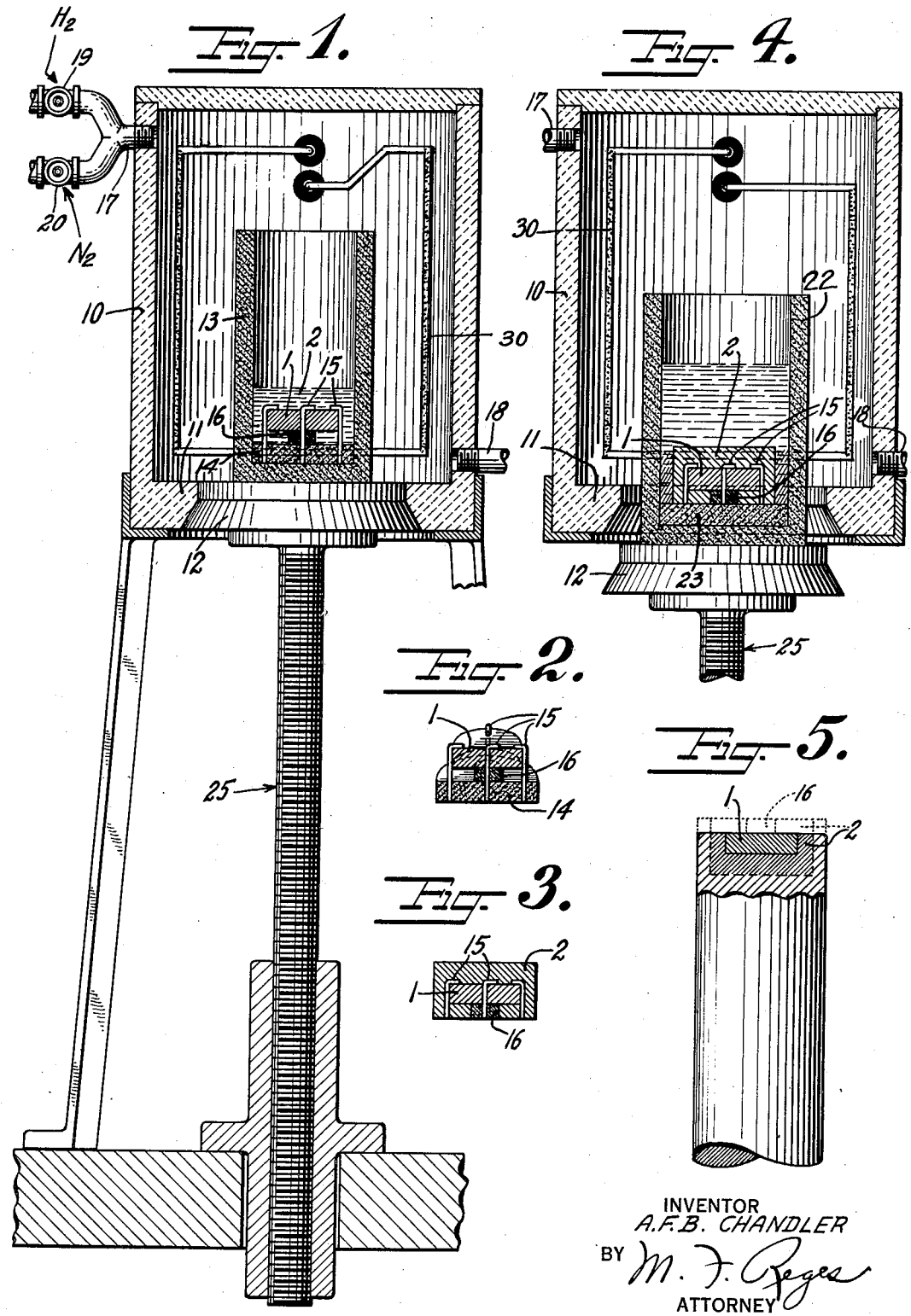

1,968,069

UNITED STATES PATENT OFFICE 1,968,069

METHOD OF MAKING CLAD METALS

Arthur F. B. Chandler, Irvington, N. J., assignor to Westinghouse Lamp Company, a corporation of Pennsylvania Application October 29, 1932, Serial No. 640,147

16 Claims. (Cl. 22—204)

This invention relates to clad metals and to a process for firmly and permanently uniting unlike metals so that said metals are free from blow holes and pipes. The invention is particularly directed to a process for producing an X-ray anode of high electrical and thermal conductivity having a target firmly embedded therein, with the juncture between said target and the body portion of said anode being mechanically strong and having high heat and electrical conductivity characteristics.

In its more specific aspect the invention is directed to improvements in the method of manufacturing clad metals and X-ray anodes described in the application of Frank H. Driggs, Serial No. 591,300, filed February 6, 1932 and assigned to the same assignee as the present application.

A process for producing X-ray anodes as defined in said Driggs application is directed to placing in a furnace a refractory metal contained in a crucible. Also contained in this crucible is a removable graphite plate whose diameter is the same as the corresponding dimension of the crucible and mounted on said plate by means of suitable tungsten or molybdenum wires is the tungsten button, whose diameter is somewhat less than that of said plate.

The first essential step of this process is carried out by placing a small quantity of commercially "pure" copper over said tungsten button and in said crucible. The crucible is then placed in a hydrogen furnace and is heated to such a temperature that the copper contained therein may be rendered in a molten condition while pure hydrogen is passed through the furnace.

Thereafter the copper coated refractory plate or button is allowed to cool to room temperature after which it is extracted from the hydrogen atmosphere.

It is known that when copper is subjected to an elevated temperature of sufficient magnitude to fuse the same and when so fused is surrounded by a reducing atmosphere, such as hydrogen, that upon cooling thereof it generally contains a number of blow holes or pipes. Because of the relative thinness of said copper coating on the tungsten any blow holes or pipes that may be contained therein are ordinarily visible, and if not visible may generally be ascertained by virtue of depressions or blisters, which commonly occur above the pipe and on the outer limit of this thin coating.

When the coated button is removed from the furnace and is at room temperature, any of these depressions or blisters are pierced in order to open up the invisible pipes or blow holes. This particular operation of piercing is not generally essential because of a machining operation, which generally follows the extraction of the coated button from the hydrogen furnace, which machining in itself is generally sufficient to open most, if not all, of these blow holes or pipes.

Thereafter this copper coated button is placed in another crucible contained in a furnace filled with carbon monoxide, which passes therethrough. At this time a relatively large mass of copper, as compared to the mass of copper in the coated button, is placed therein. This large mass of copper is to form the main body of the anode target.

Thereafter the interior of the furnace containing the carbon monoxide, together with the crucible and its contents, is heated to such a temperature that the large mass of copper may be rendered in a molten condition. After the copper metal has become molten, the crucible, together with its contents, is cooled in a progressively upward direction in order that the copper may freeze out without any pipes or blow holes.

As distinguished from said invention embodied in the Driggs application, I prefer to employ nitrogen or the like in place of the carbon monoxide. The employment of nitrogen instead of carbon monoxide offers a number of advantages, among which is the salient advantage that nitrogen is never oxidizing with respect to tungsten, while carbon monoxide is to some extent oxidizing with respect to tungsten.

Thus it is apparent that if the carbon crucible were allowed to remain in the furnace containing carbon monoxide for a long period of time some of the carbon monoxide adsorbed by the copper would travel downwardly and towards the tungsten button and ultimately come into contact with the same whereby there would be at least a slight oxidation of the tungsten at the place of contiguity between the tungsten and the copper.

However, by employing nitrogen in place of the carbon monoxide I have found that since nitrogen is never oxidizing with respect to tungsten that I have removed the possibilities of oxidizing the tungsten at the surface of contiguity between the tungsten and copper.

An object of my invention, therefore, is to provide a process for producing a bi-metallic element composed of a rare refractory metal and a low melting point metal with the low melting point metal being free from blow holes or pipes, while eliminating the possibilities of obtaining anything but a firm, mechanical union of high electrical and thermal conductivity characteristics between the low melting point metal and the refractory metal.

Another object of my invention is to provide a process for readily preparing an X-ray anode of relatively long life.

Other objects and advantages of my invention will become apparent from the following specification taken together with the appended drawing wherein Figure 1 represents a fragmentary vertical cross section with some of the parts in elevation of a furnace employed in carrying out the first stage of my invention.

Figure 2 represents a cross sectional view of a unique combination of elements employed in the carrying out of my invention.

Figure 3 represents a cross sectional view of the product obtained following the completion of the first stage of the process.

Figure 4 represents a view similar to Figure 1 illustrating the second stage of my process; and Figure 5 represents a fragmentary view of the finished product obtained in carrying out my invention.

Although my invention is broadly directed to clad metals and to the process of producing the same, for the sake of simplicity of description, ease of understanding and because it is especially applicable to X-ray anodes I will describe my invention as applied to the process for producing an X-ray anode.

According to my invention I take a rare refractory metal 1, such as tungsten or the like, of appropriate size, and for X-ray purposes, generally in the form of a button or plate and cleanse by any suitable means all of the surfaces thereof, and especially the surfaces to be coated with a low melting point metal of high thermal and electrical conductivity characteristics, preferably copper. The copper that I prefer to employ in carrying out my invention is oxygen free high conductivity copper.

These surfaces to be coated with copper are preferably subjected to an initial mechanical, chemical or other treatment so that they may be substantially freed from any oxide or other film which might prevent the tungsten and copper from forming a tenacious bond with each other. Thereafter in order that I may obtain a firm, mechanical union between the tungsten and the metal copper, which is to be united therewith, and so that the juncture between the adjacent faces of the tungsten and copper may be of high heat and electrical conductivity characteristics, the tungsten button 1 is cleansed and coated with a thin layer of molten copper in an atmosphere of hydrogen.

One suitable means for carrying out this step and employed herein so that a clear understanding of my invention may be readily ascertained, comprises a furnace 10 composed of any suitable refractory heat insulating material.

The base 11 of this furnace has a plug 12 of appropriate dimensions fitted in an opening thereof. Supported by said plug is a crucible 13, preferably composed of graphite and carrying in the face thereof a removable graphite plate 14 having embedded therein a plurality of bent spaced thin tungsten wires 15.

Carried on one surface of said plate 14 is a relatively small diameter graphite disc 16 located at the approximate center of said plate and between said wires. Mounted between said wires 15 and having a small portion of the surface thereof resting upon said disc 16 so that the outer periphery thereof is spaced from the outer periphery of said disc 16 and approximately $\frac{1}{16}$ to $\frac{3}{16}$ of an inch from the inner wall of said crucible 13 is the refractory tungsten button 1.

In opposite sides of said furnace are located a plurality of conduits 17 and 18, the former functioning to conduct hydrogen or nitrogen into the furnace and the latter to permit the egress of said gases. Thereafter an appropriate proportion of solid copper is placed upon said button and in said crucible. Generally only a sufficient quantity thereof is added thereto as is necessary upon fusion thereof to coat the exposed surfaces of the button with a copepr film 2 measuring about from $\frac{1}{16}$ to $\frac{3}{16}$ of an inch in thickness.

Prior to the heating of said metals and at this stage, hydrogen is admitted to said furnace through the conduit 17, heat is now supplied to said furnace by any suitable means, as for example, high resistance glow bars, not shown. The heating operation is maintained while the hydrogen is allowed to pass through the furnace by virtue of the conduits 17 and 18.

The crucible, together with its contents, may be heated to a temperature, as for example 1150° C., to cause the copper to become sufficiently molten to flow over the exposed surfaces of said button 1 and wet the sides thereof as well as the top and a large portion of the bottom surface thereof.

The metallic constituents in the crucible are maintained at this temperature for a short period of time. The heating current is turned off and the hydrogen is turned off by means of a valve at 19. The crucible, together with its contents is allowed to cool to room temperatures, after which the entire contents of the crucible, including the removable graphite plate 14 may be extracted therefrom en masse. Thereafter the copper of the copper coating 2 is preferably machined to remove any extraneous matter therefrom which may have become embedded in the outermost surface thereof.

Besides so cleaning the copper, this machining operation also serves to open up any hydrogen pipes or blow holes contained in this coating.

The next step of the process, as shown in Figure 4, comprises placing in a crucible 22 located within the furnace a removable graphite plate together with the machined copper coated refractory button. Both the crucible 22 and the graphite plate 23 have greater diameters than the respective crucible 13 and the graphite plate 14. At this stage a gas, such as nitrogen for example, which is inert with respect to both copper and tungsten and which has a comparatively low solubility with respect to molten copper, is admitted through the conduit 17 by means of a valve 20. The blow bars 30 are then energized so as to heat the coated button to such a temperature, as for example 1025° C. so that the copper coating thereof is elevated to a temperature just below the melting point of copper.

After the copper coated tungsten is heated to this temperature and with the nitrogen passing through the furnace a relatively large proportion of commercially pure copper is admitted into the crucible. The temperature of admitted copper is now elevated to a sufficient degree in order to render the same in a molten condition. After this added copper metal has become molten the crucible, together with its contents, is cooled in a progressively upward direction in order that the copper may freeze out without any blow holes or pipes. The copper may be admitted into the crucible before the heat is applied and may be in fragmentary form or in the form of a rod, the diameter of which is slightly less than that of the crucible. The lower end of the rod may have a recess therein of suitable dimensions so that the copper coated button located in the crucible may readily fit in said recess.

Thereafter the crucible is heated to elevate the temperature of its contents in order to render the copper in a molten condition. Thereafter the crucible with its contained mass is allowed to cool in a progressively upward direction by actuating a jack 25 to lower the plug 12 together with the crucible 22 and its contents into the air. While slowly lowering the crucible and its contained mass into the outer atmosphere, the temperature within the furnace is preferably maintained slightly above that necessary for keeping that portion of the mass within the furnace in a molten condition.

One means that I have found suitable for this purpose is to lower the crucible into the air at a rate of about $\frac{1}{16}$ of an inch per minute and while so lowering maintaining a flow of nitrogen through the furnace and the temperature approximately constant within the furnace to keep in a molten condition that portion of the mass located within the furnace.

When carrying out this process and in accordance with my invention, the nitrogen or the like, surrounds the greater portion of the molten mass. As the crucible, together with its contents is lowered at a slow rate from the furnace into the atmosphere, the copper freezes out as crystals of oxide free copper containing no blow holes or pipes and having their major axes extending in the direction of cooling. This operation of progressive cooling is carried out until the crucible and its contents are located exteriorly of the furnace.

Although the above method represents the preferred method of carrying out my invention, it is subject to modifications. One modification of the above is to add the total amount of copper to the target containing crucible 13, which is thereafter heated to such a temperature in the presence of hydrogen that it may be rendered molten. This condition is maintained for a short period of time after which the hydrogen ambient is replaced by a "pure" nitrogen or other inert ambient that is not oxidizing with respect to either tungsten or copper and which has a low solubility in molten copper as compared to the solubility of hydrogen in molten copper. As before the crucible and its contents are cooled in a progressively upward direction.

In any event after the crucible and its contents are cooled to room temperature in this manner the target end of the rod is machined to remove the excess copper, a small portion of the wires 15 and the graphite plate 16. Thus, there is provided a copper anode having a target of tungsten firmly embedded therein, with the copper being substantially free from blow holes or voids and with the juncture between the copper and tungsten forming a union of good mechanical and thermal conductivity characteristics.

Having described my invention it is apparent that there may be many modifications and variations thereof without departing from the spirit and scope of the appended claims.

What is claimed is:

1. The method of preparing clad metals consisting of tungsten and copper comprising placing a tungsten button in a mold and in the presence of a reducing agent adding to said mold a layer of molten copper to coat the upper surface, the sides and an appreciable portion of the bottom of said tungsten button, thereafter in the presence of an atmosphere inert with respect to the copper and tungsten at the temperature at which copper becomes molten, adding to said mold another layer of molten copper, said inert atmosphere having a lower solubility factor than does said reducing agent with respect to molten copper, progressively solidifying said mass upwardly from the base of the mold while maintaining the upper portion thereof in a molten condition in the presence of said inert atmosphere, with the upper limit of said molten copper being the last to solidify.

2. The method of preparing clad metals consisting of tungsten and copper comprising, placing a tungsten button in a graphite crucible and in the presence of hydrogen coating the sides and the upper and lower faces of said button with a thin layer of molten copper, thereafter and in the presence of an atmosphere that is inert with respect to said copper and tungsten coating said thin layer with a layer of molten copper whose mass is great as compared to that of said thin layer, said inert atmosphere having a lower solubility factor than hydrogen with respect to molten copper, solidifying said molten mass from the base of the mold, upwardly by progressively moving said mold from a sphere of elevated temperature to a sphere of lower temperature with the base thereof being substantially the first portion to be moved outside said elevated temperature sphere, supplying heat to the upper portion of said mold during said movement to maintain the upper portion of said mass in a molten condition and maintaining said second mentioned atmosphere about said molten portion during said movement.

3. The process of making clad metals consisting of a relatively high melting point metal, and a relatively low melting point metal, comprising adding a relatively low melting point metal to a mass of a relatively high melting point metal, the volume of said relatively low melting point metal being comparatively great as compared to that of the relatively high melting point metal, heating said metals in the presence of a reducing atmosphere to render the low melting point metal in a molten condition, replacing said reducing atmosphere with an atmosphere that is inert with respect to both the high melting point metal and the low melting point metal at the temperature necessary to render the low melting point metal molten, said inert atmosphere having a lower solubility factor in the low melting point metal than does the reducing atmosphere, and solidifying said low melting point metal in said inert atmosphere.

4. The process of making clad metals consisting of a relatively high melting point metal and a relatively low melting point metal comprising adding a relatively low melting point metal to a mass of a relativedly high melting point metal, the volume of said relatively low melting point metal being comparatively great as compared to that of the relatively high melting point metal, heating said metals in the presence of hydrogen to render the low melting point metal in a molten condition, replacing the hydrogen with nitrogen substantially free from oxygen and thereafter solidifying said low melting point metal.

5. The method of making clad metals consisting of a relatively high melting point metal and a relatively low melting point metal comprising in the presence of a reducing atmosphere adding a relatively low melting point metal of high thermal and electrical conductivity characteristics to a relatively high melting point metal, the volume of the low melting point metal being greater than that of said high melting point metal, rendering said low melting point metal in a molten condition while in the presence of the reducing atmosphere, replacing said reducing atmosphere with an atmosphere that is inert with respect to both the low melting point metal and the high melting point metal at a temperature necessary for rendering said low melting point metal molten, said inert atmosphere having a lower solubility factor in the molten low melting point metal than is the reducing atmosphere, progressively solidifying said mass with a portion of said mass being molten throughout a portion of said progressive solidification, maintaining said inert atmosphere in contact with said molten portion during said solidification.

6. The method of making clad metals consisting of a relatively high melting point metal and a relatively low melting point metal of high electrical and thermal conductivity characteristics comprising adding to said relatively high melting point metal a relatively low melting point metal of high thermal and electrical conductivity characteristics, rendering said low melting point metal in a molten condition while in the presence of a hydrogen atmosphere, replacing said hydrogen atmosphere with an atmosphere that is inert with respect to the high melting point metal and the low melting point metal at temperatures at which the low melting point metal is rendered molten, said inert atmosphere having a solubility factor in the low melting point metal which is lower than that of the hydrogen atmosphere, slowly and progressively cooling said molten mass while still supplying heat to that portion which is to be the last to solidify, maintaining said inert atmosphere in contact with said molten portion during the cooling step.

7. The method of making clad metals consisting of tungsten and copper comprising coating a tungsten body with copper in a molten condition while in the presence of hydrogen, substituting nitrogen substantially free from oxygen in place of the hydrogen, and cooling said molten copper to solidify the same.

8. The method of making clad metals consisting of a high melting point metal and a relatively low melting point metal comprising in the presence of a reducing atmosphere coating said relatively high melting point metal with a relatively thin molten layer of a relatively low melting point metal of high thermal and electrical conductivity characteristics, thereafter and in the presence of an atmosphere that is substantially free from oxygen and inert with respect to both the low melting point metal and the high melting point metal at the temperature at which the low melting point metal is molten, adding a second layer of molten low melting point metal whose volume is great as compared to that of said thin layer, said inert atmosphere having a solubility factor in the low melting point metal which is lower than the solubility factor of the reducing atmosphere in said low melting point metal and solidifying said mass.

9. The method of making clad metals consisting of a relatively high melting point metal and a relatively low melting point metal comprising in the presence of hydrogen coating said relatively high melting point metal with a relatively thin molten layer of a relatively low melting point metal of high thermal and electrical conductivity characteristics, thereafter and in the presence of an atmosphere that is substantially free from oxygen and inert with respect to both the low melting point metal and the high melting point metal at the temperature at which the low melting point metal is molten, adding a second layer of molten low melting point metal whose mass is great as compared to that of said thin layer, said inert atmosphere having a solubility factor in the molten low melting point metal which is lower than the solubility factor of the hydrogen in said molten low melting point metal and progressively solidifying said mass with a portion of said mass being molten throughout a part of said progressive solidification and maintaining said inert atmosphere in contact with said molten portion during the solidification of said mass.

10. The method of making clad metals consisting of tungsten and copper comprising in the presence of an atmosphere reducing to both tungsten and copper coating said tungsten with a layer of molten copper, thereafter in the presence of an atmosphere non-oxidizing with respect to the tungsten and copper at which the copper is molten coating said first layer with another layer of molten copper whose volume is great as compared to that of said first layer, said second atmosphere having a lower solubility factor than said reducing atmosphere with respect to the molten copper and solidifying said mass.

11. The method of making clad metals consisting of tungsten and copper comprising in the presence of hydrogen coating said tungsten with a layer of molten copper, thereafter in the presence of an atmosphere non-oxidizing with respect to the tungsten and the copper at the temperature at which the copper is molten, coating said first layer with another layer of molten copper whose volume is great as compared to that of said first mentioned layer, said second atmosphere having a lower solubility factor than said reducing atmosphere with respect to the molten copper and solidifying said mass.

12. The method of making clad metals consisting of tungsten and copper comprising in the presence of hydrogen coating said tungsten with a layer of molten copper and thereafter in the presence of nitrogen substantially free from oxygen coating said first layer with another layer of molten copper whose mass is large as compared to that of said first layer and solidifying said mass, maintaining said nitrogen in contact with a portion of said mass during the solidification of said mass.

13. The method of preparing clad metals consisting of tungsten and copper comprising placing a tungsten button in a mold and in the presence of a reducing atmosphere coating said tungsten with molten copper also in said mold, replacing said reducing atmosphere with an atmosphere inert with respect to the copper and tungsten at the temperature at which copper becomes molten, said inert atmosphere having a lower solubility factor than does said reducing agent with respect to said molten copper, progressively solidifying said mass upwardly from the base of said mold while maintaining the upper portion thereof in a molten condition in the presence of said inert atmosphere during progressive solidification.

14. The method of preparing clad metals consisting of tungsten and copper comprising placing a tungsten button in a mold and in the presence of a hydrogen atmosphere coating said tungsten button with molten copper also in said mold, substituting nitrogen substantially free from oxygen to replace the hydrogen, progressively solidifying said mass upwardly from the base of the mold while maintaining the upper portion thereof in the molten condition in the presence of said nitrogen with the upper limit of the molten copper being the last to solidify.

15. The method of preparing clad metals consisting of tungsten and copper comprising placing a tungsten button in a mold, coating said tungsten button with molten copper subjecting the mold together with the tungsten and molten copper to an atmosphere of hydrogen, thereafter in the presence of an atmosphere inert with respect to copper and tungsten at the temperature at which copper becomes molten solidifying said mass, said inert atmosphere having a lower solubility factor in molten copper than does hydrogen.

16. The method of preparing clad metals consisting of tungsten and copper comprising, placing a tungsten button in a mold, in the presence of hydrogen coating the sides, the upper and lower faces of said button with molten copper, thereafter in the presence of an atmosphere inert with respect to tungsten at the temperature of molten copper, solidifying said mass, the solubility factor of said inert atmosphere being less in said molten copper than is that of hydrogen.

ARTHUR F. B. CHANDLER.